(12) United States Patent
Rappoport et al.

(10) Patent No.: US 8,158,726 B2
(45) Date of Patent: *Apr. 17, 2012

(54) POLY(THIOESTERS), THEIR APPLICATIONS AND DERIVATIVES

(75) Inventors: Leonid Rappoport, Mountain View, CA (US); Aleksander Yam, Sunnyvale, CA (US); Alex Vainer, Fremont, CA (US)

(73) Assignee: Polymeright, Inc., Fremont, CA (US)

( * ) Notice: Subject to any disclaimer, the term of this patent is extended or adjusted under 35 U.S.C. 154(b) by 680 days.

This patent is subject to a terminal disclaimer.

(21) Appl. No.: 11/478,455

(22) Filed: Jun. 28, 2006

(65) Prior Publication Data

US 2007/0015902 A1    Jan. 18, 2007

Related U.S. Application Data

(63) Continuation-in-part of application No. 10/826,216, filed on Apr. 16, 2004, now Pat. No. 7,087,708.

(60) Provisional application No. 60/463,123, filed on Apr. 17, 2003.

(51) Int. Cl.
C08G 75/00    (2006.01)

(52) U.S. Cl. ......... 525/373; 528/293; 528/294; 522/104

(58) Field of Classification Search .................. 528/373, 528/293, 294; 522/104
See application file for complete search history.

(56) References Cited

U.S. PATENT DOCUMENTS

| | | | |
|---|---|---|---|
| 2,221,418 A * | 11/1940 | Weihe | 528/294 |
| 2,582,605 A | 1/1952 | Richter et al. | 568/22 |
| 3,386,963 A | 6/1968 | Santaniello et al. | 528/74 |
| 4,113,707 A | 9/1978 | Louthan et al. | |
| 4,124,645 A | 11/1978 | Bertozzi | 568/22 |
| 4,131,716 A | 12/1978 | Bertozzi | 428/424.4 |
| 4,184,890 A | 1/1980 | Bertozzi | |
| 4,764,299 A | 8/1988 | Salomon | 508/570 |
| 5,407,972 A * | 4/1995 | Smith et al. | 522/96 |
| 6,114,485 A | 9/2000 | Kobayashi et al. | 526/289 |
| 6,369,188 B1 | 4/2002 | Rappoport et al. | 528/49 |
| 6,383,324 B1 | 5/2002 | Vietti et al. | 156/107 |
| 7,087,708 B2 * | 8/2006 | Rappoport et al. | 528/373 |

FOREIGN PATENT DOCUMENTS

| | | |
|---|---|---|
| WO | 2004094522 A2 | 11/2004 |
| WO | 2004094522 A3 | 11/2004 |

OTHER PUBLICATIONS

Kharasch, N. "Organic Sulfur Compounds" (1961) vol. 1: 2269-270.
Foreign communication from a related counterpart application—Supplementary European Search Report, EP 047599320.9, Apr. 27, 2009, 3 pages.

* cited by examiner

Primary Examiner — Alicia Toscano
(74) Attorney, Agent, or Firm — Conley Rose, P.C.; Rodney B. Carroll

(57) ABSTRACT

The present invention provides poly(thioesters) and monomeric diesters, produced from di(hydroxyethyl)polysulfides and various mono- and di-basic carbonic acids or their anhydrides, and their derivatives. The new compounds combine properties of polyesters and polysulfides. The poly(thioesters) can be used as components in many compositions, including but not limited to adhesives, sealants, caulks, coatings, plastics, paints and elastomers. The monomeric diesters find use in compositions such as solvents and plasticizers.

9 Claims, 2 Drawing Sheets

Product of Interaction of Di(hydroxyethyl)polysulfide and Maleic Anhydride

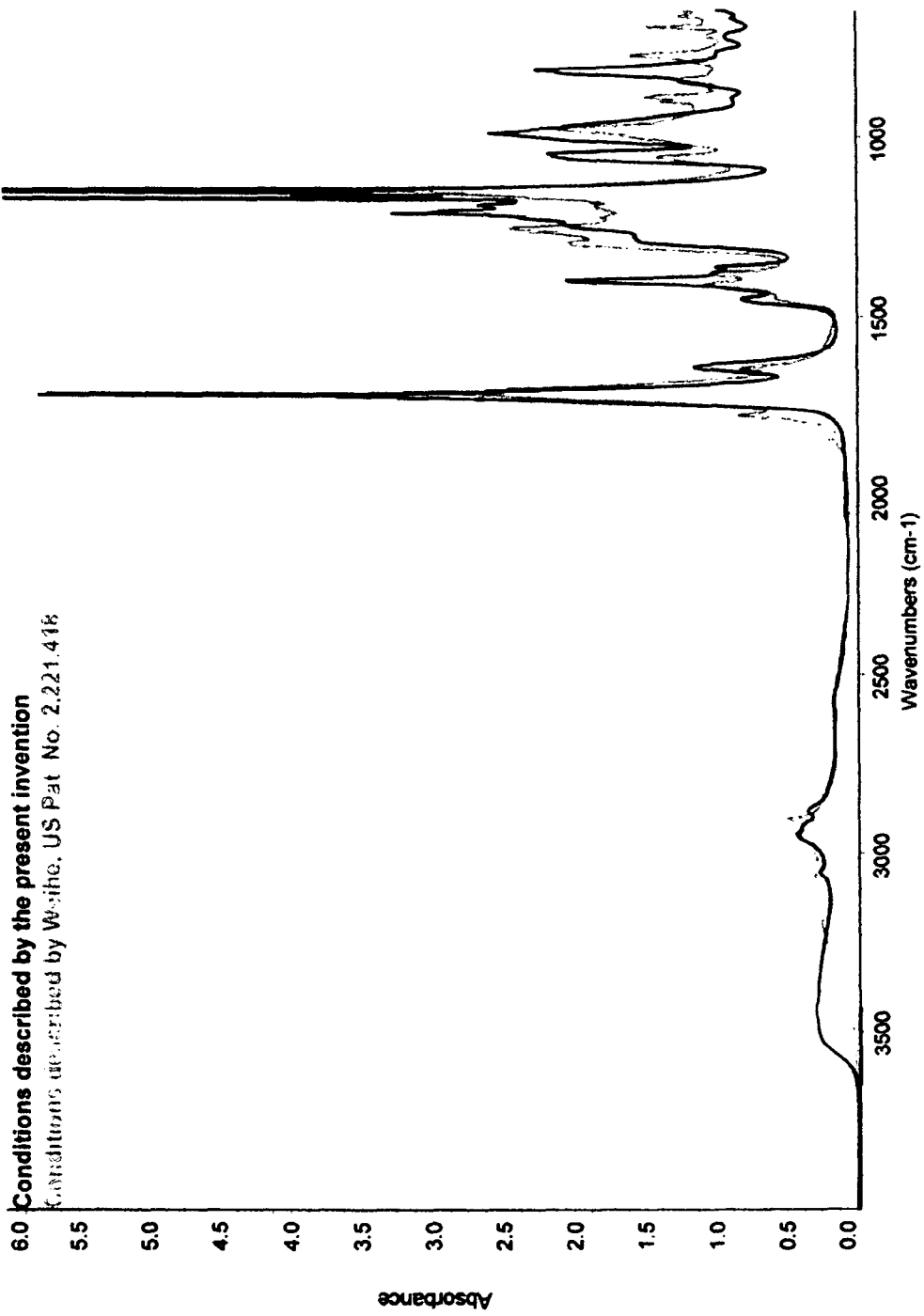
Figure 1. Product of Interaction of Di(hydroxyethyl)polysulfide and Maleic Anhydride

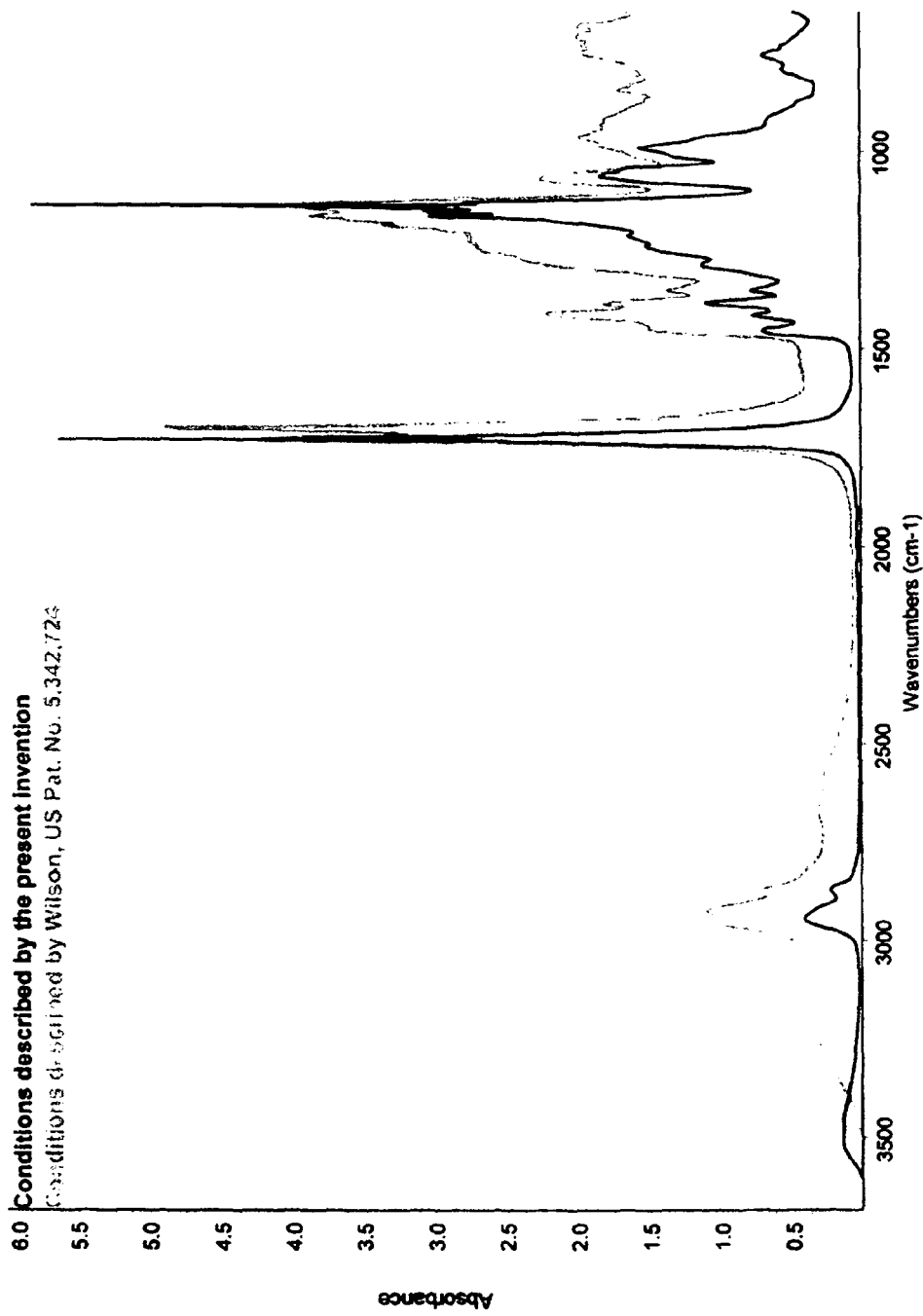
Figure 2. Product of Interaction of Di(hydroxyethyl)polysulfide and Adipic Acid

POLY(THIOESTERS), THEIR APPLICATIONS AND DERIVATIVES

CROSS-REFERENCE TO RELATED APPLICATIONS

This application is a continuation-in-part of U.S. patent application Ser. No. 10/826,216, filed Apr. 16, 2004, now U.S. Pat. No. 7,087,708 which claims priority from U.S. Provisional Patent Application No. 60/463,123, filed Apr. 17, 2003, both of which are incorporated herein by reference.

FIELD OF THE INVENTION

The present invention relates generally to synthetic chemistry. More particularly, the present invention relates to poly(thioesters), monomeric diesters and their derivatives.

BACKGROUND

Hydroxyl groups that are in the β-position relative to a sulfur atom in an aliphatic chain have unusually high reactivity, and their properties are significantly different from other hydroxyl groups. For example, unlike compounds with hydroxyl groups in other positions, compounds with hydroxyl groups in the β-position relative to a sulfur atom in an aliphatic chain readily undergo self-polycondensation as well as co-condensation with other glycols in the presence of other acids and/or at elevated temperatures, resulting in the formation of poly(thioethers) (F. Richter, et. al., U.S. Pat. No. 2,582,605).

Di(hydroxyethyl)disulfide, as well as other di(hydroxyethyl)polysulfides are typical compounds with hydroxyl groups in the β-position relative to a sulfur atom. They are known in the art to be precursors for various poly(thioethers), which have been used in lubricants (U.S. Pat. No. 2,582,605), in polyurethanes (U.S. Pat. No. 3,386,963), in mercaptan-terminated oligomers (U.S. Pat. No. 4,124,645), in transmission fluids (U.S. Pat. No. 4,764,299), and in acetal-functional compounds used in window insulation (U.S. Pat. No. 6,383,324).

The prior art describes several attempts to convert di(hydroxyethyl)polysulfides into various compounds that contain ester functionality adjacent to the $-(CH_2)_n-S-$ segment. For example, U.S. Pat. No. 6,114,485 discloses compounds that include an $-O-C(O)-(CH_2)_2-S-$ segment in monomeric products, but the chemical structure of these compounds is achieved through a chain of several complex chemical reactions that take multiple steps and over 20 hours of combined reaction time. In addition, the technology described in this patent cannot be used to produce polymeric products with multiple poly(thioester) segments.

U.S. Pat. Nos. 2,221,418 by Weihe et al. (referred to hereafter as Weihe) and 5,407,972 by Smith et al. (referred to hereafter as Smith) describe products that are produced after (polythio)glycols are mixed with dicarbonic acids and/or their anhydrides. However, these patents do not describe the formation of poly(thioesters) from these products. For example, Weihe describes the formation of an "insoluble balsam", and Smith describes "polysulfide polymers" produced as the result of the interaction between di(hydroxyethyl)polysulfides and dibasic carbonic acids or their anhydrides.

Nowhere in Weihe or Smith is described the chemical structure of the resulting products. However, based on the above-described unusual reactivity of hydroxyl groups in the β-position relative to a sulfur atom, and the strong tendency of such hydroxyl groups to homo-condense according to reaction (1), it is highly likely that the products formed by Weihe and Smith under the conditions described in these patents are poly(thioethers), rather than poly(thioesters).

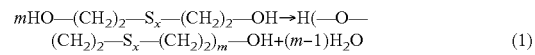

$$mHO-(CH_2)_2-S_x-(CH_2)_2-OH \rightarrow H(-O-(CH_2)_2-S_x-(CH_2)_2)_m-OH + (m-1)H_2O \quad (1)$$

In the case where the products were formed with the participation of dibasic carbonic acids, they would likely form a solution of dibasic carbonic acids in solid or semi-solid poly(thioether) resins. In the case where the products were formed with the participation of anhydrides of dibasic carbonic acids, the solid or semi-solid poly(thioether) resins would have a chance to react with anhydrides. This would allow the formation of a randomly-formed compound with no more than two radicals per molecule and a single ester structure for each radical. A regular poly(thioester)polymer would not be formed.

The absence in the prior art of the description of regular poly(thioesters) produced from compounds with hydroxyl groups in the β-position relative to a sulfur atom is further illustrated by Wilson in U.S. Pat. No. 5,342,724 (referred to hereafter as Wilson). Wilson describes the formation of multiple poly(thioesters) from sulfur-containing diols and dibasic carbonic acids. However, all sulfur-containing diols with hydroxyl groups in the β-position relative to the sulfur atoms were left out from the list of diols mentioned by Wilson, as the state-of-the art technology available at the time did not allow production of poly(thioesters) from such compounds.

Accordingly, there is a need in the art to develop methods of forming poly(thioesters) from sulfur-containing diols with hydroxyl groups in the β-position relative to the sulfur atoms.

SUMMARY OF THE INVENTION

The present invention provides poly(thioesters), produced from di(hydroxyethyl)polysulfides and various dibasic carbonic acids or their anhydrides, and their derivatives. The new poly(thioesters) combine properties of polyesters and polysulfides. The poly(thioesters) can be used as components in many compositions, including but not limited to adhesives, sealants, caulks, coatings, plastics, paints and elastomers. In one embodiment, the poly(thioesters) have the formula:

$$R^2-[-O-A-O-B-]_n-O-A-O-R^2$$

wherein
each $R^2$ is H or $R^1$-$f$,
  wherein $R^1$ is any bi-valenced organic radical, and
  $f$ is H or any reactive functional group;
each $R^2$ is the same or different;
A is either X or Y,
  wherein
    X is 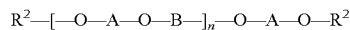 $-(-(CH_2)_2-S_x-(CH_2)_2-O-)_m-(CH_2)_2-S_x-(CH_2)_2-$,
    Y is $-C(O)-R^1-C(O)-$,
    m is at least zero, and
    x is between two and six;
B is either Y or X;
O, H, C, and S have their normal meaning of oxygen, hydrogen, carbon, and sulfur;
if A is X, then B is Y;
if A is Y, then B is X; and
n is at least one, except for the case when A is Y, B is X, $R^1$ is a dibasic carbonic acid that is a cyclic anhydride or forms a cyclic anhydride, and $R^2$ is H, in which case n is at least two.

In another embodiment, the poly(thioesters) have the formula:

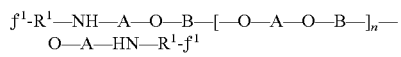

wherein
A is —C(O)—R$^1$—C(O)—;
B is —((CH$_2$)$_2$—S$_x$—(CH$_2$)$_2$—O—)$_m$—(CH$_2$)$_2$—S$_x$—(CH$_2$)$_2$—;
R$^1$ is any bi-valenced organic radical;
m is at least zero;
n is at least one;
x is between two and six;
$f^1$ is a hydroxyl, a primary amine group, a secondary amine group or a tertiary amine group; and
O, H, C, S, and N have their normal meaning of oxygen, hydrogen, carbon, sulfur and nitrogen.

In yet another embodiment, the poly(thioesters) have the formula:

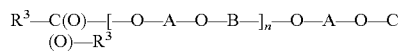

wherein
A is —((CH$_2$)$_2$—S$_x$—(CH$_2$)$_2$—O—)$_m$—(CH$_2$)$_2$—S$_x$—(CH$_2$)$_2$—;
B is —C(O)—R$^1$—C(O)—;
R$^1$ is any bi-valenced organic radical;
m is at least zero;
n is at least one;
x is between two and six;
R$^3$ is R$^1$-$f^2$, HN—R$^1$-$f^3$, or HN—R$^4$—NCO,
wherein
$f^2$ is a chemical structure or functional group;
$\eta^3$ is a chemical structure of functional group; and
R$^4$ is a radical that is located between two isocyanate groups of a di- or poly-isocyanate; and
O, H, C, S, and N have their normal meaning of oxygen, hydrogen, carbon, sulfur and nitrogen.

In an additional embodiment, the poly(thioesters) have the formula:

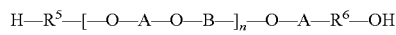

wherein
A is —((CH$_2$)$_2$—S$_x$—(CH$_2$)$_2$—O—)$_m$—(CH$_2$)$_2$—S$_x$—(CH$_2$)$_2$—;
B is —C(O)—R$^1$—C(O)—;
R$^1$ is any bi-valenced organic radical;
m is at least zero;
n is at least one;
x is between two and six;
R$^5$ is H[O—CH$_2$—CHR$^3$]$_{q-k}$ or [O—CHR$^3$]$_{q-k}$;
R$^6$ is [O—CHR$^3$—CH$_2$]$_q$ or [O—CHR$^3$]$_k$;
if R$^5$ is H[O—CH$_2$—CHR$^3$]$_{q-k}$, then R$^6$ is [O—CHR$^3$—CH$_2$]$_q$;
if R$^5$ is [O—CHR$^3$]$_{q-k}$, then R$^6$ is [O—CHR$^3$]$_k$;
R$^3$ is either H or methyl;
q is at least one;
q is greater than or equal to k;
and O, H, C, S, and N have their normal meaning of oxygen, hydrogen, carbon, sulfur and nitrogen.

The present invention further provides novel monomeric diesters. The new monomeric diesters are produced from di(hydroxyethyl)polysulfides and various monobasic carbonic acids or their anhydrides. The monomeric diesters have use as components in many compositions, including but not limited to solvents and plasticizers.

Monomeric diesters according to the present invention have the formula:

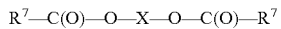

wherein
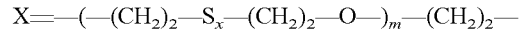
R$^7$ is either H, or any monovalent organic radical;
each R$^7$ is either the same or different;
m is at least zero;
x is at least one; and
O, H, C, and S have their normal meaning of oxygen, hydrogen, carbon, and sulfur.

BRIEF DESCRIPTION OF THE FIGURES

The present invention together with its objectives and advantages will be understood by reading the following description in conjunction with the drawings, in which:
FIG. 1 compares IR spectra of products made according to Weihe and poly(thioesters) according to the present invention.
FIG. 2 compares IR spectra of products made according to Wilson and poly(thioesters) according to the present invention.

DETAILED DESCRIPTION OF THE INVENTION

The present invention provides poly(thioesters) of the formula:

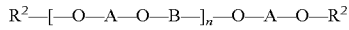

wherein
R$^2$ is H;
A is either X or Y,
wherein
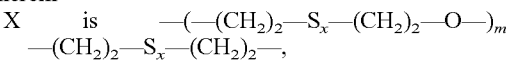
Y is —C(O)—R$^1$—C(O)—,
R$^1$ is any bivalenced radical,
m is at least zero, and
x is between two and six;
B is either Y or X;
O, H, C, and S have their normal meaning of oxygen, hydrogen, carbon, and sulfur;
if A is X, then B is Y;
if A is Y, then B is X; and
n is at least one, except for the case when A is Y, B is X, and R$^1$ is a dibasic carbonic acid that is a cyclic anhydride or forms a cyclic anhydride, in which case n is at least two. Poly(thioesters) according to the present invention are made from reacting two main components. The first component includes di(hydroxyethyl)polysulfides, homopolymers of di(hydroxyethyl polysuflides), or a mixture of di(hydroxyethyl)polysulfides and homopolymers of di(hydroxyethyl) polysulfides. The second component includes dibasic carbonic acids and their anhydrides, or mixtures of dibasic carbonic acids and their anhydrides. The two components are reacted in the presence of a protonic acidic catalyst at a temperature of between about 80° C. and about 130° C.

Any type of protonic acidic catalyst may be used according to the present invention. Preferably, the acidic catalyst is a nonoxidizing protonic acidic catalyst. More preferably, the acidic catalyst is methanesulphonic acid. When methanesulphonic acid is used as the catalyst, the two components may be reacted at a temperature of between about 80° C. and about 180° C.

Any di(hydroxyethyl)polysulfides (or homopolymers thereof) may be used according to the present invention. Preferably, the di(hydroxyethyl)polysulfide is a di(hydroxyethyl)disulfide, a di(hydroxyethyl)trisulfide, or a di(hydroxyethyl)tetrasulfide.

Any dibasic carbonic acid or its anhydride may be used according to the present invention. Preferred dibasic carbonic acids are $C_2$ to $C_{40}$ saturated and unsaturated acids, substituted and unsubstituted carboxylic diacids and their anhydrides. Examples include, but are not limited to, fatty acid dimers, malonic, succinic, glutaric, adipic, pimelic, suberic, azelaic, sebacic, maleic, fumaric, phthalic, isophthalic, terephthalic, hemimellitic, trimellitic, trimesic, nonane-di-carbonic, decane-di-carbonic, brassylic, dithiodiacetic, dithiodipropionic, and dithiodibutyric acids and their anhydrides. In addition, mixtures of dibasic carbonic acids or their anhydrides may be used to make poly(thioesters) according to the present invention.

Though the chemical reactions shown below illustrate the interaction between di(hydroxyethyl)polysulfides and dibasic carbonic acids, any person skilled in the art can understand that similar reactions can occur when the anhydrides of dibasic carbonic acids are taken in the place of the acids themselves.

The structure, molecular weight and other properties of poly(thioesters) can be varied by a person skilled in the art within a wide range of parameters to achieve targeted properties of the final polymer. The mechanisms that allow such a variation in properties include selecting a dibasic carbonic acid with a particular structure, and properly choosing its molar ratio with di(hydroxyethyl)polysulfide or its homopolymer. These mechanisms make it possible to obtain both carboxyl- and hydroxyl-terminated poly(thioesters) with different pre-regulated lengths of polymeric chain, as well as high molecular weight poly(thioester)polymers. In particular, varying the structure of the carboxyl-carrying participants in the reaction, and the molar ratio of the reactants, allows producing poly(thioesters) with the desired type of termination (carboxyl- and hydroxyl-terminated compounds), desired structure of repetitive polymeric segment, and desired number of such segments per molecule, i.e. molecular weight of the product.

Varying the molar ratio of components between 1:1 and 2:1 allows the production of poly(thioesters) containing the desired number of polysulfide segments and ester groups. If the molar ratio of reactants is close to 2:1, low molecular weight or oligomeric compounds are produced. If the molar ratio of reactants is close to 1:1, high molecular weight thermoplastic poly(thioesters) are produced.

Carboxyl-terminated poly(thioesters) are produced from di(hydroxyethyl)polysulfides and dibasic carbonic acids according to reaction (2), when the molar concentration of the carboxyl group in the reaction mixture is higher than the molar concentration of the hydroxyl group.

$$(n+1)HO\text{---}A\text{---}OH + nHO\text{---}B\text{---}OH \rightarrow H[\text{---}O\text{---}A\text{---}O\text{---}B\text{---}]_n\text{---}O\text{---}A\text{---}OH + (n+1)H_2O \quad (2)$$

where
A=—C(O)—R$^1$—C(O)—
B=—((CH$_2$)$_2$—S$_x$—(CH$_2$)$_2$—O—)$_m$—(CH$_2$)$_2$—S$_x$—(CH$_2$)$_2$—
m≧0
1≦n≦25

Hydroxyl-terminated poly(thioesters) are produced according to the reaction (2),
where A=—((CH$_2$)$_2$—S$_x$—(CH$_2$)$_2$—O—)$_m$—(CH$_2$)$_2$—S$_x$—(CH$_2$)$_2$—, and
B=—C(O)—R$^1$—C(O)—

High molecular weight poly(thioesters) are produced when the molar concentration of the hydroxyl group in the reaction mixture approximately equals the molar concentration of the carboxyl group, i.e. when in the reaction (2) n>25. In the case of high molecular weight poly(thioesters), if one component is taken in slight excess, its termination will be prevailing. High-molecular weight poly(thioesters) are thermoplastic materials that can be formed by extrusion, injection or compression molding or other similar techniques.

Poly(thioesters) according to the present invention can be used as the basis of many different compositions. Low molecular weight, or oligomeric compounds can be used as components in various adhesive, sealant, caulk, coating, paint, elastomer or other compositions. The carboxyl-terminated poly(thioester) oligomers can be chain extended and crosslinked, for example, by polyaziridines, epoxies and inorganic salts, oxides and hydroxides. The action of di- and/or polyisocyanates will convert oligomeric hydroxy-terminated poly(thioesters) into solid polyurethanes with a poly(thioester) backbones.

High molecular weight thermoplastic poly(thioesters) can be used for the production of flexible plastics, or used as an additive, which imparts targeted properties on such materials as polyethylene terephthalate, and cured unsaturated polyesters, vinyl esters, or other similar plastics.

Products Derived from Carboxyl-terminated Poly(thioesters)

Carboxyl-terminated poly(thioesters) can further react with hydroxyl-containing substances using an esterification mechanism to form compounds of the formula:

$$R^2\text{---}[\text{---}O\text{---}A\text{---}O\text{---}B\text{---}]_n\text{---}O\text{---}A\text{---}O\text{---}R^2$$

wherein
each $R^2$ is $R^1$-ƒ,
    wherein $R^1$ is any bi-valenced organic radical, and
    ƒ is H or any reactive functional group;
each $R^2$ is the same or different;
A is —C(O)—R$^1$—C(O)—;
B is —(—(CH$_2$)$_2$—S$_x$—(CH$_2$)$_2$—O—)$_m$—(CH$_2$)$_2$—S$_x$—(CH$_2$)$_2$—;
wherein
m is at least zero;
x is between two and six; and
O, H, C, and S have their normal meaning of oxygen, hydrogen, carbon, and sulfur.

The esterification mechanism takes place in typical conditions for such reactions, familiar to any person skilled in the art. Reaction (3) describes such reactions $$\text{ƒ-}R^1\text{---}OH + H[\text{---}O\text{---}A\text{---}O\text{---}B\text{---}]_n\text{---}O\text{---}A\text{---}OH + HO\text{---}R^1\text{-ƒ} \rightarrow \text{ƒ-}R^1\text{---}[\text{---}O\text{---}A\text{---}O\text{---}B\text{---}]_n\text{---}O\text{---}A\text{---}O\text{---}R^1\text{-ƒ} + 2H_2O \quad (3)$$

where ƒ is a chemical structure or functional group that introduces special properties and characteristics, allowing further utilization of the newly produced compound. The structure of ƒ includes, but is not limited to hydroxyl, acrylic, methacrylic, allyl, vinyl, maleic, activated halogen, nitrile, cyclocarbonate, mercaptan and tertiary amine groups.

Examples of carriers of various ƒ functionalities include:
For hydroxyl functionality—any diol, polyol, or organic oxide;
For acrylic functionality—hydroxy acrylate;

For methacrylic functionality—hydroxy methacrylate;

For allyl and vinyl functionalities—any compound containing both a hydroxyl group and an allyl or vinyl group, such as monovinyl ether of diethyleneglycol;

For cyclocarbonate functionality—glycerol carbonate;

For amine functionality—N,N'-dialkylethanolamine;

For activated halogen functionality—a monoester of any glycol and chloroacetic acid;

For maleic double bond functionality—maleic anhydride;

For nitrile functionality—ethylenecyanohydrin; and

For mercaptan functionality—mercaptoethanol.

One important example of reaction (3) is when $f$ is another hydroxyl group. Carboxyl-terminated poly(thioesters) can react with an individual polyol, or mixture of polyols, forming, depending on the poly(thioester)/polyols molar ratio, a blocked polymer, which includes poly(thioester) and polyether blocks. The molecular weight of the final product, and the proportion of the polyester/polyether segments in it can be pre-determined by the molar ratio of the reactive component. For example, if one takes 2 moles of component A and one mole of component B, the resulting product will mostly contain molecules with molecular weight equaled to twice the molecular weight of A plus one molecular weight of B. This is the lowest molecular weight product obtained by polycondensation (in this case it is not "polycondensation", but plain condensation). In contrast, if one takes 1 mole of A and 1 mole of B, one would theoretically get one polymeric molecule with molecular weight approaching infinity. Any ratio between 1:1 and 2:1 will result in a product with a definite molecular weight, so that a person skilled in art can, by choosing the ratio of components, choose the molecular weight of the final product. It must be noted that if one of the polyols that participates in this process has functionality higher than 2, the resulting products have a degree of branching, which is pre-determined by the molar amount of the high functionality polyol.

The products of reaction (3) with compounds other than polyols can also be used in various reactive formulations cured by the radical mechanism in the cases of acrylic, methacrylic, allyl and vinyl-terminated substances, by the action of air moisture in the cases of alkoxysilane-terminated substances, by diamines in the case of cyclocarbonate-terminated materials, and by the anionic mechanism in the case of tertiary amine-terminated materials.

Carboxyl-terminated polythioesters can further react with any compound with amine group(s) through an amidation mechanism to form compounds of the formula:

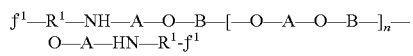

wherein

A is —C(O)—R$^1$—C(O)—;

B is —((CH$_2$)$_2$—S$_x$—(CH$_2$)$_2$—O—)$_m$—(CH$_2$)$_2$—S$_x$—(CH$_2$)$_2$—;

R$^1$ is any bi-valenced organic radical;

m is at least zero;

n is at least one;

x is between two and six;

$f^1$ is a hydroxyl, a primary amine group, a secondary amine group or a tertiary amine group; and O, H, C, S, and N have their normal meaning of oxygen, hydrogen, carbon, sulfur and nitrogen.

The amidation reactions take place in typical conditions for such reactions, familiar to any person skilled in the art. Reaction (4) describes such reactions.

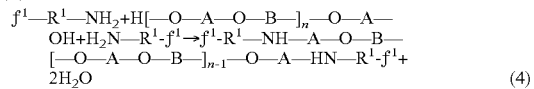

(4)

where $f^1$ is a hydroxyl, or a primary, secondary or tertiary amine group.

An important example of reaction (4) is when $f^1$ is a primary or secondary amine group. Carboxyl-terminated poly(thioesters) can react with diamines, forming, depending on the poly(thioester)/diamine molar ratio, either amidoamine, or polyamide with poly(thioester) segments. If an amidoamine is desired, in order to generate a product with the least amount of undesirable byproducts, it is beneficial to react the carboxyl-terminated poly(thioester) with a diamine that has unequal reactivity of amine groups, i.e. either has one primary and one secondary amine group, such as in N-aminoethyl piperazine, or one sterically hindered amine group, such as trimethylhexamethylenediamine, 2-methylpentamethylenediamine, 1,3-pentanediamine and isophorone diamine. On the other hand, if the goal of the technological process is to produce polyamide with poly(thioester) segments, it is better to use in reaction (4) a diamine with two primary amine groups with equal reactivity.

Amidoamines produced as the result of reaction (4) can be used as is, or in a mixture with other products, for example as curing agents for epoxy coatings and adhesives formulations.

Products Derived from Hydroxyl-Terminated Poly(Thioesters)

Hydroxyl-terminated poly(thioesters) can further react with any compound typically reactive with hydroxyl groups, providing compounds with new types of functionalities. These reactions can utilize an esterification mechanism following reaction (5), an etherification mechanism following reactions (6), (7) or (8), or an isocyanate mechanism following reactions (9) or (10).

Hydroxyl-terminated poly(thioesters) can react using an esterification mechanism to form compounds of the formula:

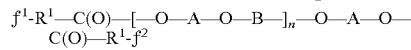

wherein

A is —((CH$_2$)$_2$—S$_x$—(CH$_2$)$_2$—O—)$_m$—(CH$_2$)$_2$—S$_x$—(CH$_2$)$_2$—;

B is —C(O)—R$^1$—C(O)—;

R$^1$ is any bi-valenced organic radical;

m is at least zero;

n is at least one;

x is between two and six;

$f^2$ is a chemical structure or functional group; and

O, H, C, and S, have their normal meaning of oxygen, hydrogen, carbon, and sulfur.

The esterification reaction takes place in typical conditions for such reactions, familiar to any person skilled in the art, and is described in reaction (5).

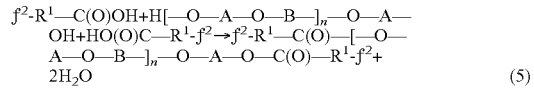

(5)

where $f^2$ is a chemical structure or functional group that introduces special properties and characteristics, allowing further utilization of the newly produced compound. The structure of $f^2$ includes, but is not limited to hydroxyl, carboxyl, acrylic, methacrylic, allyl, vinyl, maleic, activated halogen, nitrile, cyclocarbonate, and mercaptan.

Examples of carriers of various $f^2$ functionalities include:

For carboxyl functionality—any bi-functional carbonic acids, for example, maleic or succinic acids, or dimers of fatty acids;

For hydroxyl functionality—any compound that has both a hydroxyl and carboxyl group, for example, glycolic acid;
For acrylic functionality—acrylic acid;
For methacrylic functionality—methacrylic acid;
For active halogen functionality—chloracetic acid, or its analogs;
For allyl, vinyl and other double bond functionalities—any unsaturated carbonic acid;
For maleic double bond functionality—maleic acid;
For nitrile functionality—monoesters of any dicarbonic acid and ethylenecyanohydrin; and
For mercaptan functionality—mercaptopropyonic acid.

The case where $f^2$ is a carboxyl (i.e. the first reagent in reaction (5) is a dibasic carbonic acid, which can be either the same or different from the dibasic carbonic acid used in the production of the second reagent in reaction (5)) is of special interest. Introduction of a dibasic acid as a second reagent in reaction (5) allows changing the molecular weight of the produced polymer by choosing the structure of $R^1$ and molar ratio of the participants in reaction (5). Any person skilled in the art will recognize that it is possible to produce similar reaction products if, instead of dibasic carbonic acids, the second reagent in reaction (5) is anhydrides of such acids.

The produced polyesters with poly(thioester) blocks can be used as such, or as additives to other plastics. In the case when the hydroxyl-terminated poly(thioesters) react with maleic acid, the produced segmented unsaturated polysulfide-containing polyester can be cured by all the conventional methods of curing of unsaturated polyesters, and used as a copolymerizable additive to the conventional unsaturated polyesters.

The special properties of hydroxyl groups located in the β-position to the disulfide group, as taught by the U.S. Pat. No. 2,582,605, allows them to easily participate in the reactions of etherification with other alcohols, glycols and polyols, to form compounds of the formula:

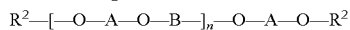

wherein
each $R^2$ is $R^1$-$f$,
wherein $R^1$ is any bi-valenced organic radical, and
$f$ is H or any reactive functional group;
each $R^2$ is the same or different;
A is $—(—(CH_2)_2—S_x—(CH_2)_2—O—)_m—(CH_2)_2—S_x—(CH_2)_2—$;
B is $—C(O)—R^1—C(O)—$;
wherein
m is at least zero;
x is between two and six; and O, H, C, and S have their normal meaning of oxygen, hydrogen, carbon, and sulfur.

The etherification reaction takes place in typical conditions for such reactions, familiar to any person skilled in the art, and is described in reaction (6).

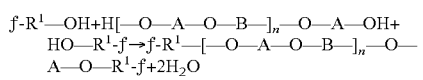

(6)

where $f$ is a chemical structure or functional group that introduces special properties and characteristics, allowing further utilization of the newly produced compound. The structure of $f$ may be, but is not limited to hydroxyl, acrylic, methacrylic, allyl, vinyl, maleic, activated halogen, nitrile, cyclocarbonate, mercaptan and amine groups. Examples of carriers of various $f$ functionalities include:
For hydroxyl functionality—any diol, polyol, or organic oxide;
For acrylic functionality—hydroxy acrylate;
For methacrylic functionality—hydroxy methacrylate;
For allyl and vinyl functionalities—any compound containing both a hydroxyl group and an allyl or vinyl group, such as monovinyl ether of diethyleneglycol;
For cyclocarbonate functionality—glycerol carbonate;
For amine functionality—N,N'-dialkylethanolamine;
For activated halogen functionality—a monoester of any glycol and chloroacetic acid;
For maleic double bond functionality—maleic anhydride;
For nitrile functionality—ethylenecyanohydrin; and
For mercaptan functionality—mercaptoethanol.

The case where $f$ is a hydroxyl is of a special interest, as it allows changing the molecular weight of the produced polymer by choosing the structure of $R^2$ and the molar ratio of the participants in the reaction (6).

Another type of etherification reaction takes place when a hydroxyl-terminated poly(thioester) is treated with either ethylene oxide, or propylene oxide, to form compounds of the formula:

wherein
A is $—((CH_2)_2—S_x—(CH_2)_2—O—)_m—(CH_2)_2—S_x—(CH_2)_2—$;
B is $—C(O)—R^1—C(O)—$;
$R^1$ is any bi-valenced organic radical;
m is at least zero;
n is at least one;
x is between two and six;
$R^5$ is $H[O—CH_2—CHR^3]_{q-k}$;
$R^6$ is $[O—CHR^3—CH_2]_q$;
$R^3$ is either H or methyl;
q is at least one;
q is greater than or equal to k;
and O, H, C, and S have their normal meaning of oxygen, hydrogen, carbon, and sulfur.

This etherification reaction takes place in typical conditions for such reactions, familiar to any person skilled in the art, and is described in reaction (7).

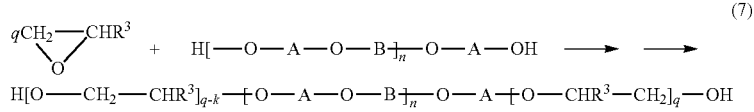

(7)

where
$R^3$ is either H, or methyl,
$q \geq 1$,
$q \geq k$,

This reaction produces derivatives of poly(thioesters) that are useful, for example, in coatings formulations.

Another possible type of useful derivatives of hydroxyl-terminated poly(thioesters) can be produced by their reac tions with formaldehyde to form polyacetals with a poly(thioester) backbone, as described in the following formula:

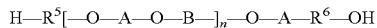

wherein
A is $-((CH_2)_2-S_x-(CH_2)_2-O-)_m-(CH_2)_2-S_x-(CH_2)_2-$;
B is $-C(O)-R^1-C(O)-$;
$R^1$ is any bi-valenced organic radical;
m is at least zero;
n is at least one;
x is between two and six;
$R^5$ is $[O-CHR^3]_{q-k}$;
$R^6$ is $[O-CHR^3]_k$;
$R^3$ is either H or methyl;
q is at least one;
q is greater than or equal to k;
and O, H, C, and S have their normal meaning of oxygen, hydrogen, carbon, and sulfur.

This etherification reaction takes place in typical conditions for such reactions, familiar to any person skilled in the art, and is described in reaction (8).

$$qR^3CHO + H[-O-A-O-B-]_n-O-A-OH \rightarrow H[O-CHR^3]_{q-k}-[-O-A-O-B-]_n-O-A-[O-CHR^3]_k-OH \quad (8)$$

The hydroxyl groups of the hydroxyl-terminated poly(thioesters) readily participate in reactions with compounds containing isocyanate groups. Of these compounds the most important and frequently used are those made from di- and polyisocyanates, of the formula:

$$R^3-C(O)-[-O-A-O-B-]_n-O-A-O-C(O)-R^3$$

wherein
A is $-((CH_2)_2-S_x-(CH_2)_2-O-)_m-(CH_2)_2-S_x-(CH_2)_2-$;
B is $-C(O)-R^1-C(O)-$;
$R^1$ is any bi-valenced organic radical;
m is at least zero;
n is at least one;
x is between two and six;
$R^3$ is $HN-R^1-f^3$,
    wherein $f^3$ is a chemical structure of functional group; and
O, H, C, S, and N have their normal meaning of oxygen, hydrogen, carbon, sulfur and nitrogen.

These compounds can be made through the isocyanate reaction shown in reaction (9). This reaction takes place in typical conditions for such reactions, familiar to any person skilled in the art.

$$f^3-R^1-NCO+H[-O-A-O-B-]_n-O-A-OH+OCN-R^1-f^3 \rightarrow f^3-R^1-NH-C(O)-[-O-A-O-B-]_n-O-A-O-(O)C-HN-R^1-f^3 \quad (9)$$

where $f^3$ includes, but is not limited to isocyanate, epoxy, acrylic, methacrylic, alkoxysilane, mercaptan, cyclocarbonate, tertiary amine, vinyloxy, and mixtures thereof.

A very important case is when $f^3$ is another isocyanate group. Depending on the molar ratio between the hydroxyl-terminated poly(thioester) and isocyanate-containing compound, the reaction can either terminate in an isocyanate prepolymer with a poly(thioester) backbone (reaction (10)), or in a polyurethane with polythioester segments.

When hydroxyl-terminated poly(thioester) and isocyanate-containing compound are taken in the molar ratio close to 1:2, the reactions between them result in the formation of an isocyanate prepolymer of the formula:

$$R^3-C(O)-[-O-A-O-B-]_n-O-A-O-C(O)-R^3$$

wherein
A is $-((CH_2)_2-S_x-(CH_2)_2-O-)_m-(CH_2)_2-S_x-(CH_2)_2-$;
B is $-C(O)-R^1-C(O)-$;
$R^1$ is any bi-valenced organic radical;
m is at least zero;
n is at least one;
x is between two and six;
$R^3$ is $HN-R^4-NCO$,
    wherein $R^4$ is a radical that is located between two isocyanate groups of a di- or poly-isocyanate; and
O, H, C, S, and N have their normal meaning of oxygen, hydrogen, carbon, sulfur and nitrogen.

This reaction takes place in typical conditions for such reactions, familiar to any person skilled in the art and is described in reaction (10).

$$OCN-R^4-NCO+H[-O-A-O-B-]_n-O-A-OH+OCN-R^4-NCO \rightarrow OCN-R^4-NH-C(O)-[-O-A-O-B-]_n-O-A-O-(O)C-HN-R^4-NCO \quad (10)$$

where $R^4$ is a bivalent radical located between two isocyanate groups of a diisocyanate, preferably of a diisocyanate with unequal reactivity of isocyanate groups, such as 2,4-toluene diisocyanate, isophorone diisocyanate, or trimethylhexamethylenediisocyanate.

The isocyanate prepolymers produced by the reaction (10) can be
  a) converted into polyurethanes with poly(thioester) blocks by reactions with a diol chain extender, and polyol crosslinkers;
  b) converted into poly(urea-urethanes) with poly(thioester) blocks by reactions with aromatic diamine chain extenders and crosslinkers;
  c) converted into reactive and non-reactive functional oligomers with poly(thioester) backbones by the methods described in the U.S. Pat. No. 6,369,188. The functionality of the produced urethane-functional polysulfide-containing compounds includes, but is not limited to epoxy, acrylic, methacrylic, alkoxysilane, mercaptan, cyclocarbonate, tertiary amine, vinyloxy, and mixtures thereof.

When hydroxyl-terminated poly(thioester) and isocyanate-containing compound are taken in close-to-equimolar amounts, the reactions between them result in the formation of a polyurethane with polythioester segments. These polyurethanes have improved properties due to the presence of polysulfide blocks.

Production of Monomeric (Polythio)Diesters

The present invention also provides monomeric (polythio) diesters of the formula:

$$R^7-C(O)-O-X-O-C(O)-R^7$$

wherein
$X=-(-(CH_2)_2-S_x-(CH_2)_2-O-)_m-(CH_2)_2-S_x-(CH_2)_2-$;
$R^7$ is either H, or any monovalent organic radical;
the two $R^7$s are either the same or different;
m is at least zero;
x is at least one; and
O, H, C, and S have their normal meaning of oxygen, hydrogen, carbon, and sulfur.

In order to produce these products, dihydroxyethylpolysulfide and/or its homopolymers react with individual monobasic carbonic acids, such as acetic, chloroacetic, propyonic, fatty, etc. acids, their anhydrides, or mixtures of such acids or anhydrides under conditions similar to those described above for dibasic acids. The (polythio)diesters are produced according to reaction (11)

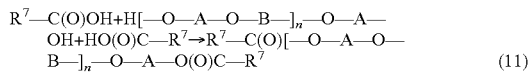

$$R^7—C(O)OH+H[—O—A—O—B—]_n—O—A—OH+HO(O)C—R^7 \rightarrow R^7—C(O)[—O—A—O—B—]_n—O—A—O(O)C—R^7 \quad (11)$$

where $R^7$ is H or any monovalent organic acid. In one embodiment, $R^7$ is a monobasic carboxylic acid having between two and nineteen carbons.

The produces low viscosity polysulfide-containing diesters that are very effective solvents and plasticizers for a wide variety of polymeric products.

EXAMPLES

The majority of experimental work on the products described in this patent was based on a commercially-available DiHEDS, a product of the Chevron Phillips Chemicals LP, which contains approximately 95-97% of di(hydroxyethyl)disulfide, and 3-5% of the higher molecular weight di(hydroxyethyl)trisulfide and other, higher molecular weight di(hydroxyethyl)polysulfides. However, in regards to the subject of this invention, all di(hydroxyethyl)polysulfides behave similarly.

Di(hydroxyethyl)polysulfides with sulfidity higher than that of DiHEDS, which were used to create some of the poly(thioesters) that are the subject of this invention, were obtained by dissolving elemental sulfur in DiHEDS at 115-120° C.

The homopolymers of di(hydroxyethyl)polysulfides (polythioethers) that were used to create some of the poly (thioesters) that are the subject of this invention were obtained by polyetherification of DiHEDS (Reaction 1) in the presence of acidic catalysts (preferably phosphoric acid) at 140-180° C.

Any person skilled in the art will recognize that most of the processes described in the present invention can take place not only at 80-130° C., in the presence of acidic catalysts, but also outside of this preferred range of temperatures. However, at temperatures below 80° C. the reaction rate slows down to a degree that the chemical production process becomes impractical, and at temperatures above 130° C. the input of the reaction of homopolycondensation of di(hydroxyethyl) polysulfides (i.e. formation of poly(thioethers)) becomes more and more pronounced, and the determination of the chemical structure of the products formed at higher temperatures becomes more and more problematic. An exception is when the reaction is conducted with methanesulphonic acid as the catalyst. In this case, the homopolycondensation reaction is minimal up to about 180° C.

Example 1

Production of Carboxyl-terminated Poly(thioester) from Di(hydroxyethyl)disulfide and Fatty Acid Dimer 27 g of di(hydroxyethyl)disulfide (DiHEDS, produced by Chevron Phillips Chemicals LP, Regular grade) and 200 g fatty acid dimer (CAS #61788-89-4, Pripol-1013 from Uniqema, ICI Company) were combined in a jacketed reaction vessel and agitated. The molar ratio of components was 1:2.

0.2 g of 98% p-toluenesulfonic acid monohydrate (CAS #6192-52-5, obtained from Sigma-Aldrich) was used as a catalyst. The esterification reaction proceeded at 125-130° C. (260-270° F.) for 3-4 hours with constant mixing. 10 mm Hg vacuum was applied in order to facilitate the removal of water from the reaction mixture. For process control during this stage the concentration of carboxyl groups was monitored (ASTM D 465).

The process ended when the concentration of acid approached the calculated acid number of the carboxyl-terminated polythioester, and no further distillate was formed. The acid number of the produced material equaled 83.6 mg KOH/g, while the projected acid number was 83.58. The material produced was a brown liquid with 6000 cPs viscosity.

Example 2

Production of Hydroxyl-terminated Poly(thioester) from Di(hydroxyethyl)disulfide and Succinic Anhydride 308 g di(hydroxyethyl)disulfide (DiHEDS, CPChem L.L.C., Water-free grade) and 100 g of succinic anhydride (Sigma-Aldrich #108-30-5) (molar ratio 1:2) were combined in a reaction vessel and heated to 120° C., followed by the addition of 4 g of catalyst, methanesulfonic acid (CAS #75-75-2, Sigma-Aldrich). The system was mixed for 1 hr under 10 mm Hg vacuum and mixing continued at 120° C. until no more water was distilled from the reaction mixture. For process control the concentration of carboxyl groups was monitored by ASTM D 465. At the end of the process the residual concentration of carboxyl groups was negligible. The produced substance was a clear yellowish viscous (2000 cPs) liquid, which later crystallized into a white hard waxy material.

Example 3

Production of Hydroxyl-terminated Poly(thioester) from Di(hydroxyethyl)disulfide and Adipic Acid 600 g di(hydroxyethyl)disulfide (DiHEDS, CP Chem L.L.C. Water-free grade) and 474 g of adipic acid (Adipure by DuPont, CAS #124-04-9) (molar ratio 6:5) were combined in a reaction vessel and 3.13 g of methanesulfonic acid (CAS number 75-75-2, Sigma-Aldrich) added. The mixture was heated to 120° C. with mixing for 1 hr, under 10 mm Hg vacuum and reaction maintained at 120° C. until no more water was distilled from the reaction mixture. For process control the concentration of carboxyl groups was monitored by ASTM D 465. At the end of the process the residual concentration of carboxyl groups was negligible. The produced substance was a clear yellowish viscous (~3000 cPs) liquid, which later crystallized into a white hard waxy material.

Example 4

Production of Hydroxyl-terminated Poly(thioester) from Di(hydroxyethyl)disulfide and Maleic Anhydride 1900 g di(hydroxyethyl)disulfide (DiHEDS CP Chem L.L.C. Water-free grade) and 907 g of maleic anhydride (Alfa Aesar, CAS #108-31-6) (molar ratio 4:3) were combined in a reaction vessel. The mixture was heated to 57° C. with mixing for 1 hr, under Argon, until maleic anhydride dissolved. The reaction mixture was intensely agitated for 40 minutes without external heat source, and the temperature has ridden to 80° C. 14 g of methanesulfonic acid (Chevron Phillips Chemicals, CAS number 75-75-2,) were added and the mixture was heated to 90° C. for 10 minutes. Argon was turned off when the condensation products were observed on the walls of the reactor, and 10 mm Hg vacuum was applied for 1 hour at 80° C., until no more water was distilled from the reaction mixture. For process control the concentration of carboxyl groups was monitored by FTIR. At the end of the process the residual concentration of carboxyl groups was negligible (the peaks 1785 and 1850 cm$^{-1}$ attributed to the maleic anhydride and 1705 cm$^{-1}$ attributed to the carboxyl's carbonyl group have disappeared). The produced substance was a clear not very viscous (~800 cPs) liquid.

The spectrum of this product is shown in FIG. 1 alongside with a spectrum of a material produced from the same raw materials under conditions described by Weihe (U.S. Pat. No. 2,221,418, Example 4—equimolar amounts, 5 hours @140° C.), which is an extremely viscous (>500,000 cPs) dark brown balsam. These spectra clearly demonstrate that the compositions of matter generated from the same raw materials under different conditions are quite dissimilar. Similar spectral differences are present in the products of interaction of succinic anhydride and di(hydroxyethyl)disulfide when they were obtained under conditions described by Smith (180-220° F. in the presence of triethylamine).

Example 5

Production of Hydroxyl-terminated Poly(thioester) from Di(hydroxyethyl)disulfide, Succinic Anhydride and Dimethylolpropionic Acid 308 g di(hydroxyethyl)disulfide (DiHEDS CP Chem L.L.C. Water-free grade), 400 g of succinic anhydride, and 402 g of dimethylolpropionic acid (DMPA, GEO Specialty Chemicals, CAS #4767-03-7) (molar ratio 2:4:3) were combined and heated to 130° C. with mixing for 2.5 hr, under 10 mm Hg vacuum. Under these conditions, all hydroxyls of DiHEDS have reacted with the carboxyl groups of the succinic acid, forming a carboxyl-terminated polythioester dissolved in the residual dimethylolpropionic and succinic acids.

Then the temperature was increased to 180° C., 1% of methanesulphonic acid catalyst was added to the reaction mixture, and mixing continued at 180° C. until no more water was distilled from the reaction mixture. At this stage of the process, dimethylolpropionic acid, acting as a diol, has reacted with the residual succinic acid and carboxyl-terminated polythioester, forming an oligomeric resin with a polythioester backbone that is terminated with two hydroxyl and three carboxyl groups.

The concentration of carboxyl groups was monitored by ASTM D 465. At the end of the process the residual concentration of carboxyl groups was equal to the concentration of the DMPA carboxyls. The produced material was an amber highly viscous (200,000 cPs) liquid.

Example 6

Production of Polysulfide-containing Amidoamine from the Carboxyl-terminated Poly(thioester)

To the product from the Example 1 without isolation or cooling was added N-aminoethylpiperazine (AEP, CAS #140-31-8, Huntsman Corp. or Air Products and Chemicals, Inc) in the amount of 1.05 mol AEP per one mol of carboxyl. Assuming the targeted acid number of 83.58 mg KOH/g was reached in the first stage, the ratio is 20.4 parts of AEP per 100 parts of produced polyester. A typical second stage reaction time is 2-3 hours at 155-160° C. under atmospheric pressure. After reaching the targeted amine number, which for this product is 71.2 mg KOH/g, the reactor pressure was reduced to at least 10 mm Hg. to distill off the water produced in the second stage reaction. The temperature during the vacuum period is maintained at 155-160° C. For process control in this stage the amine number is monitored by ASTM D 2073. The process ends when the amine number approaches the targeted amine number and no more water was being removed under vacuum. The produced material was a brown semi-solid substance with a melting range 40-50° C. that was soluble in conventional diamines.

Example 7

Production of Polysulfide-containing Isocyanate Prepolymer from Hydroxyl-terminated Poly(thioester)

400 g of poly(thioester) from Example 2 were melted at 60° C. and mixed with 15 g 3ST 25 Zeochem Purmol Zeolite powder (produced by Zeochem, Louisville, Ky.) to remove traces of water. The mixture was later combined in a reaction vessel with 234 g of isophorone diisocyanate (Vestanat® IPDI, Degussa Corp., CAS #4098-71-9) (molar ratio 1:2.05). The reaction mixture was heated to 90° C. and agitated for 3 hrs under argon flow. The concentration of isocyanate groups was monitored by ASTM D 2572-97. At the end of the process the concentration of isocyanate groups was 2.4 N, which is equal to half of the initial concentration of isocyanate groups. The produced material was a whitish opaque very viscous (150,000 cPs) liquid.

Example 8

Production of Polysulfide-containing Isocyanate Prepolymer from Hydroxyl-terminated Poly(thioester)

445 g of poly(thioester) from Example 3 were melted at 60° C. and mixed with 15 g 3ST Zeochem Purmol Zeolite powder (produced by Zeochem, Louisville, Ky.) to remove traces of water. The produced mixture was combined in a reaction vessel with 372 g of methylene-bis(cyclohexylisocyanate) (Desmodur W, Bayer Corp., CAS #5124-30-1) and heated to 90° C. and stirred for 1 hr, under argon flow.

95.2 g of dimethylolpropionic acid (DMPA, GEO Specialty Chemicals, CAS #4767-03-7), 200 g of N-methyl pyrrolidinone (NMP BASF, CAS #872-50-4) and 36 g of triethylamine (TEA, J T Baker, CAS #121-44-8) were added to the reaction mixture. The temperature was reduced to 70° C. and the reaction mixture was mixed at this 5 temperature for 1 hour under argon. The concentration of isocyanate groups was monitored by ASTM D 2572-97. At the end of the process the concentration of isocyanate groups was 0.68 N, which exactly equaled the calculated concentration of terminal isocyanate groups in the produced prepolymer with pendant carboxyl groups inhibited from reaction by the triethylamine. The produced material was a whitish viscous liquid with viscosity of approximately 70,000 cPs.

Example 9

Production of Hydroxyl-terminated Poly(thioester) from Di(hydroxyethyl)polysulfide and Adipic Acid 504 g of di(hydroxyethyl)polysulfide (obtained by dissolving 1 mol of sulfur in 1 mol of DiHEDS) and 313 g of adipic acid (Adipure by DuPont, CAS #124-04-9) (molar ratio 5:4) were combined in a reaction vessel and 3 g of 70% solution of methanesulfonic acid (produced by Chevron Phillips Chemical) were added to the reaction mixture. The mixture was heated to 120° C. with mixing for 1 hr, under 10 mm Hg vacuum and reaction maintained at 120° C. until no more water was distilled from the reaction mixture. For process control the concentration of carboxyl groups was monitored by ASTM D 465. At the end of the process the residual concentration of carboxyl groups was negligible. The produced substance was a brown viscous liquid, which did not crystallize. The spectrum of this material is shown in FIG. 2.

By way of comparison, di(hydroxyethyl)disulfide (a compound excluded by Wilson from the list of sulfur-containing diols) and adipic acid were combined under conditions described by Wilson (180° C., nitrogen atmosphere followed by vacuum, lead acetate/antimony oxide catalyst). The spectrum of the resulting materials is shown in FIG. 2, alongside with a spectrum of the inventive product. The resulting polymers proved to have absolutely dissimilar structures.

Example 10

Production of the Maleic-terminated Polythioester with Di(hydroxyethyl)polysulfide/Adipic Acid Polyester Backbone 673 g of poly(thioester) from Example 9 were combined with 105 g of maleic anhydride. and heated to 90° C. with stirring under argon, until FTIR spectrum has shown complete disappearance of the peaks 1785 and 1850 cm$^{-1}$ attributed to the anhydride group of maleic anhydride.

The produced material was a whitish viscous liquid with viscosity of approximately 10,000 cPs, which demonstrated the typical reactions of maleic-terminated oligomers.

Example 11

Production of Carboxyl-terminated Poly(thioester) from Di(hydroxyethyl)polysulfide and Adipic Acid 452 g of di(hydroxyethyl)polysulfide (obtained by dissolving 1 mol of sulfur in 1 mol of DiHEDS) and 532 g of adipic acid (Adipure by DuPont, CAS #124-04-9) (molar ratio 2:3) were combined in a reaction vessel and 5.3 g of 70% solution of methanesulfonic acid (produced by Chevron Phillips Chemical) were added to the reaction mixture. The mixture was heated to 115° C. with mixing for 1 hr, under 10 mm Hg vacuum and reaction maintained at 115° C. until no more water was distilled from the reaction mixture. For process control the concentration of carboxyl groups was monitored by ASTM D 465. At the end of the process the molar concentration of carboxyl groups was 2.8, while theoretically it should be 2.71. The produced substance was a brown viscous liquid, which did not crystallize.

Example 12

Production of the Mercaptan-terminated Polythioester with Di(hydroxyethyl)polysulfide/Adipic Acid Polyester Backbone 900 g of poly(thioester) from Example 11 were combined with 190 g of bis-mercaptoethanol (BME, produced by Chevron Phillips Chemical). Additional 2.3 g of 70% solution of methanesulfonic acid (produced by Chevron Phillips Chemical) were added to the reaction mixture, which was heated to 90° C. with stirring under argon for 1 hour. Then 10 mm Hg vacuum was applied and reaction maintained at 90° C. until no more distillate was produced, and until FTIR spectrum has shown complete disappearance of the 1705 cm$^{-1}$ peak, which is attributed to the carboxyl's carbonyl group.

The produced material was a brow viscous liquid with viscosity of approximately 10,000 cPs, which demonstrated the typical reactions of mercaptan-terminated oligomers.

Example 13

Production of a Monomeric Diester from Di(hydroxyethyl)disulfide and Acetic Acid 154 g di(hydroxyethyl)disulfide (DiHEDS CPChem L.L.C., Water-free grade) and 120 g of glacial acetic acid (molar ratio 1:2) were combined in a reaction vessel and heated to 75° C., followed by the addition of 0.85 g of catalyst, methanesulfonic acid (CAS number 75-75-2, Sigma-Aldrich). The system was heating to 90° C. and mixed for 1 hr. The temperature was raised to 103° C. and 10 mm Hg vacuum was applied. The system cooled down to 75° C., and extra 50 g of glacial acetic acid were added. The reaction mixture was reheated, and vacuum was applied. This operation (including the addition of extra portions of acetic acid) was repeated 3 times, until changes in the FTIR spectrum after each reheating cycle became unnoticeable. The produced substance was a clear low viscosity liquid with specific gravity 1.21-1.22, which was a very effective plasticizer for a wide variety of halogenated polymers.

It is evident from the above results that the subject compounds can be readily prepared in good yield under convenient conditions. The subject monomers provide desirable properties to a large number of products enhancing the properties of products prepared from conventional monomers. By replacing all or a portion of diols or dibasic acids used in making condensation polymers, the resulting products have improved physical and chemical characteristics. By modifying the subject monomers with addition polymerizable monomers, the properties of the resulting polymeric product are similarly enhanced.

As one of ordinary skill in the art will appreciate, various changes, substitutions, and alterations could be made or otherwise implemented without departing from the principles of the present invention. Accordingly, the scope of the invention should be determined by the following claims and their legal equivalents.

What is claimed is:

1. A compound produced from the reaction between
a) di(hydroxyethyl)polysulfides, homopolymers of di(hydroxyethyl)polysulfides, or a mixture of di(hydroxyethyl)polysulfides and homopolomyers of di(hydroxyethyl) polysulfides; and
b) mono-basic or di-basic carbonic acids, their anhydrides, mixtures of dibasic carbonic acids and their anhydrides, or mixtures of mono-basic carbonic acids and their anhydrides wherein said carbonic acids and their anhydrides are selected from the group consisting of $C_2$-$C_{40}$ saturated and unsaturated carbonic acids, substituted and unsubstituted carboxylic mono- and diacids and their anhydrides;
wherein the molar ratio of the components is between 1:1 and 2:1, wherein said reaction is conducted at a temperature of between about 80° C. and about 130° C., and wherein said reaction is conducted in the presence of a protonic acidic catalyst.

2. The compound as set forth in claim 1, wherein said acidic catalyst comprises a nonoxidizing acidic catalyst.

3. The compound as set forth in claim 1, wherein said di(hydroxyethyl) polysuflides are selected from the group consisting of di(hydroxyethyl)disulfide, di(hydroxethyl) trisulfide and di(hydroxyethyl)tetrasulfide.

4. A compound produced from the reaction between
   a) di(hydroxyethyl)polysulfides, homopolymers of di(hydroxyethyl)polysulfides, or a mixture of di(hydroxyethyl)polysulfides and homopolomyers of di(hydroxyethyl) polysulfides; and
   b) mono-basic or di-basic carbonic acids, their anhydrides, mixtures of dibasic carbonic acids and their anhydrides, or mixtures of mono-basic carbonic acids and their anhydrides wherein said carbonic acids and their anhydrides are selected from the group consisting of $C_2$-$C_{40}$ saturated and unsaturated carbonic acids, substituted and unsubstituted carboxylic mono- and diacids and their anhydrides;
   wherein the molar ratio of the components is between 1:1 and 2:1, wherein said reaction is conducted at a temperature of between about 80° C. and about 180° C., and wherein said reaction is conducted in the presence of methanesulphonic acid.

5. The compound as set forth in claim 4, wherein said di(hydroxyethyl) polysulfides are selected from the group consisting of di(hydroxyethyl)disulfide, di(hydroxethyl) trisulfide and di(hydroxyethyl)tetrasulfide.

6. The compound as set forth in claim 1, wherein the compound is produced by the reaction between
   a) di(hydroxyethyl)polysulfides, homopolymers of di(hydroxyethyl)polysulfides, or a mixture of di(hydroxyethyl)polysulfides and homopolomyers of di(hydroxyethyl) polysulfides; and
   b) di-basic carbonic acids, their anhydrides, or mixtures of dibasic carbonic acids and their anhydrides.

7. The compound as set forth in claim 4, wherein the compound is produced by the reaction between
   a) di(hydroxyethyl)polysulfides, homopolymers of di(hydroxyethyl)polysulfides, or a mixture of di(hydroxyethyl)polysulfides and homopolomyers of di(hydroxyethyl) polysulfides; and
   b) di-basic carbonic acids, their anhydrides, or mixtures of dibasic carbonic acids and their anhydrides.

8. The method of claim 1 wherein the protonic acidic catalyst is toluenesulfonic acid.

9. A compound produced from the reaction between
   a) di(hydroxyethyl)polysulfides, homopolymers of di(hydroxyethyl)polysulfides, or a mixture of di(hydroxyethyl)polysulfides and homopolomyers of di(hydroxyethyl) polysulfides; and
   b) mono-basic or di-basic carbonic acids, their anhydrides, mixtures of dibasic carbonic acids and their anhydrides, or mixtures of mono-basic carbonic acids and their anhydrides wherein said carbonic acids and their anhydrides are selected from the group consisting of $C_2$-$C_{40}$ saturated and unsaturated carbonic acids, substituted and unsubstituted carboxylic mono- and diacids and their anhydrides;
   wherein the molar ratio of the components is between 1:1 and 2:1, wherein said reaction is conducted at a temperature of between about 80° C. and about 180° C., and wherein said reaction is conducted in the presence of p-toluenesulfonic acid.

* * * * *